US012599264B2

(12) United States Patent
Grady

(10) Patent No.: US 12,599,264 B2
(45) Date of Patent: Apr. 14, 2026

(54) CITRUS PEELER

(71) Applicant: Halilea Enterprises, Inc., Boulder, CO (US)

(72) Inventor: Leona Grady, Boulder, CO (US)

(73) Assignee: Halilea Enterprises, Inc., Boulder, CO (US)

( * ) Notice: Subject to any disclaimer, the term of this patent is extended or adjusted under 35 U.S.C. 154(b) by 204 days.

(21) Appl. No.: 17/930,736

(22) PCT Filed: Apr. 22, 2021

(86) PCT No.: PCT/US2021/070442
§ 371 (c)(1),
(2) Date: Sep. 9, 2022

(87) PCT Pub. No.: WO2021/217183
PCT Pub. Date: Oct. 28, 2021

(65) Prior Publication Data
US 2024/0197101 A1 Jun. 20, 2024

Related U.S. Application Data

(60) Provisional application No. 63/014,655, filed on Apr. 23, 2020.

(51) Int. Cl.
*A47J 17/04* (2006.01)
(52) U.S. Cl.
CPC .................................... *A47J 17/04* (2013.01)
(58) Field of Classification Search
CPC .. A47J 17/00; A47J 17/02; A47J 17/04; A47J 25/00

(Continued)

(56) References Cited

U.S. PATENT DOCUMENTS

| 100,862 | A | * | 3/1870 | Cooke | ..................... | A47J 17/02 |
| | | | | | | 30/123.5 |
| 206,707 | A | * | 8/1878 | Doane | ..................... | A47J 17/02 |
| | | | | | | 30/123.5 |

(Continued)

FOREIGN PATENT DOCUMENTS

| BE | 1021827 B1 | * | 1/2016 | .............. | A47J 17/04 |
| BR | 7101710 U | * | 3/1993 | .............. | A47J 17/04 |

(Continued)

OTHER PUBLICATIONS

International Search Report mailed Jul. 16, 2021 issued in connection with International Application No. PCT/US2021/070442 (2 pages total).

(Continued)

*Primary Examiner* — Jason Daniel Prone

(57) ABSTRACT

A citrus peeler is has properties to make removing a fruit's outer skin and pith easier for a user is implemented, in which the citrus peeler can be used with fruits like grapefruit, orange, etc. The citrus peeler has a handle and a neck extending from the handle. The neck is flattened relative to the handle and forms a plane. Extending substantially perpendicular from the neck's top surface is a channel knife for cutting the rind off of the fruit. The channel knife extends vertically from one arm of the neck and is sharpened to enable easy cutting of the fruit's outer skin. The channel knife can cut around the circumference of the fruit to create a circumferential channel that provides the entry point to the fruit sac.

5 Claims, 8 Drawing Sheets

(58) Field of Classification Search
USPC ....... 30/123.5–123.7, 279.2–279.6, 340, 342
See application file for complete search history.

(56) References Cited

U.S. PATENT DOCUMENTS

| | | | | | |
|---|---|---|---|---|---|
| 379,238 | A | * | 3/1888 | McNeal | A47J 17/04 30/353 |
| 379,328 | A | * | 3/1888 | Porter | A47J 17/02 30/123.5 |
| 457,376 | A | * | 8/1891 | Sherman | A47J 25/00 30/113.3 |
| 559,961 | A | * | 5/1896 | Barr | A47J 17/04 30/123.7 |
| 687,820 | A | * | 12/1901 | Crandall | A47J 17/04 30/123.6 |
| D41,318 | S | * | 4/1911 | Alvord | D7/693 |
| D48,236 | S | * | 11/1915 | Alvord | D7/693 |
| 1,301,297 | A | * | 4/1919 | Newman | A47J 25/00 30/123.5 |
| 1,352,325 | A | * | 9/1920 | Sullivan | A47J 17/04 30/279.2 |
| 1,442,577 | A | * | 1/1923 | Kugel et al. | A47J 17/04 30/113.3 |
| 1,448,678 | A | * | 3/1923 | Sargent | A47J 17/02 30/278 |
| 1,452,930 | A | * | 4/1923 | Polk | A47J 17/04 30/123.5 |
| 1,479,015 | A | * | 1/1924 | Steinman | A47J 17/02 30/113.3 |
| 1,482,736 | A | * | 2/1924 | Catsules | A47J 17/04 30/286 |
| 1,630,186 | A | * | 5/1927 | Kelly | A47J 17/04 30/353 |
| 1,638,956 | A | * | 8/1927 | Pinchbeck et al. | A47J 17/04 30/113.3 |
| 1,771,296 | A | * | 7/1930 | Harley et al. | A47J 17/04 30/279.6 |
| 1,907,582 | A | * | 5/1933 | Ray | A47J 17/02 30/279.6 |
| 2,022,954 | A | * | 12/1935 | Cook | A47J 17/04 30/123.5 |
| D99,855 | S | * | 6/1936 | Coughlan | 30/355 |
| 2,079,496 | A | * | 5/1937 | Domack | A47J 17/02 30/279.6 |
| 2,083,368 | A | * | 6/1937 | Gambino | A47J 17/02 30/279.6 |
| 2,132,320 | A | * | 10/1938 | Quinn | A47J 17/02 30/279.6 |
| 2,258,448 | A | * | 10/1941 | Gesell | A47J 17/04 30/113.3 |
| 2,291,179 | A | * | 7/1942 | Woginrich | A47J 17/02 30/278 |
| 2,522,054 | A | * | 9/1950 | Novak | A47J 17/04 30/123.7 |
| 2,539,225 | A | * | 1/1951 | Bettencourt | A47G 21/005 30/115 |
| 2,540,220 | A | * | 2/1951 | Standal | A47J 17/02 30/279.2 |
| 2,546,032 | A | * | 3/1951 | Holmberg | A47J 17/04 30/123.5 |
| 2,549,326 | A | * | 4/1951 | Moore | A47J 17/04 30/123.7 |
| 2,591,973 | A | * | 4/1952 | Smith | A47J 17/04 30/294 |
| 2,692,428 | A | * | 10/1954 | Morishita | A47J 17/04 30/123.5 |
| 2,727,302 | A | * | 12/1955 | Countryman | A47J 17/04 30/123.7 |
| D177,743 | S | * | 5/1956 | Marx | D7/650 |
| 2,900,717 | A | * | 8/1959 | Byrd et al. | A47J 17/04 30/123.6 |
| 2,938,267 | A | * | 5/1960 | Tupper | A47J 17/02 30/142 |
| 2,974,411 | A | * | 3/1961 | Little | A47J 17/04 30/123.5 |
| 3,003,232 | A | | 10/1961 | McDonald | |
| 3,086,286 | A | * | 4/1963 | Faller | A47J 17/04 30/123.7 |
| 3,149,417 | A | * | 9/1964 | Lowry | A47J 17/04 30/123.5 |
| 3,237,299 | A | * | 3/1966 | Gibbs | A47J 17/04 30/123.7 |
| 3,286,346 | A | * | 11/1966 | Perry | A47J 17/04 30/123.5 |
| 3,299,510 | A | * | 1/1967 | Taormina | A47J 17/02 30/279.6 |
| 3,384,959 | A | * | 5/1968 | Tobias | A47J 17/02 30/142 |
| 3,571,925 | A | * | 3/1971 | Deutschmann | A47J 17/04 30/314 |
| 3,618,208 | A | * | 11/1971 | Cronheim | A47J 17/04 30/113.1 |
| 3,769,706 | A | * | 11/1973 | Ashdown | A47J 25/00 30/113.3 |
| 3,885,307 | A | * | 5/1975 | Papalardo | A47J 17/02 30/123.5 |
| D235,964 | S | * | 7/1975 | Livato et al. | 30/113.1 |
| 3,913,226 | A | * | 10/1975 | Lovato | B26B 3/00 30/123.5 |
| 3,978,583 | A | * | 9/1976 | Papalardo | A47J 17/02 30/123.5 |
| 4,083,107 | A | * | 4/1978 | Kuka | A47J 17/04 30/123.7 |
| 4,163,317 | A | * | 8/1979 | Levanti | A47J 17/02 30/123.7 |
| 4,215,471 | A | * | 8/1980 | Schaefer | A47J 17/04 30/356 |
| 4,255,854 | A | * | 3/1981 | Bilbao | A47J 17/04 30/304 |
| 4,290,197 | A | | 9/1981 | Zaroor | |
| D269,052 | S | * | 5/1983 | Windsor | D3/28 |
| 4,630,367 | A | * | 12/1986 | Pressman | A47J 17/04 30/279.6 |
| 4,970,786 | A | * | 11/1990 | Harper | A47J 17/04 30/113.1 |
| D320,144 | S | * | 9/1991 | Ban-Dak | D7/693 |
| 5,052,108 | A | * | 10/1991 | Yang | A47J 17/02 30/123.5 |
| D366,185 | S | * | 1/1996 | Lie | D7/401.2 |
| 5,692,308 | A | * | 12/1997 | Di Libero | B26B 9/02 30/308 |
| D453,285 | S | * | 2/2002 | Dostal | D7/693 |
| 6,360,442 | B2 | * | 3/2002 | O'Brien | A47J 17/04 30/123.5 |
| 7,127,820 | B2 | * | 10/2006 | Miller | B23D 61/123 30/279.2 |
| D756,170 | S | * | 5/2016 | Cook | D7/649 |
| D798,675 | S | * | 10/2017 | Aldous | D7/649 |
| D845,086 | S | * | 4/2019 | McMahon | D7/649 |
| 2004/0025352 | A1 | * | 2/2004 | Vitucci | A47J 17/04 30/123.5 |
| 2004/0117991 | A1 | | 6/2004 | Haberstroh | |
| 2006/0042097 | A1 | * | 3/2006 | Kim | A47J 17/02 30/279.6 |
| 2010/0269715 | A1 | | 10/2010 | Curtin | |
| 2012/0288601 | A1 | * | 11/2012 | Wegwerth | A47J 17/02 99/571 |

FOREIGN PATENT DOCUMENTS

| | | | | | |
|---|---|---|---|---|---|
| CH | | 169628 | A | * | 6/1934 | A47J 17/04 |
| DE | 202006006392 | U1 | * | 7/2006 | A47J 17/04 |
| DE | 202007015114 | U1 | * | 11/2008 | A47J 17/04 |
| GB | | 324240 | A | * | 1/1930 | A47J 17/04 |
| GB | | 340489 | A | * | 12/1930 | A47J 17/04 |
| GB | | 1255669 | A | * | 12/1971 | A47J 17/04 |
| IT | | 1061175 | B | * | 10/1982 | |

(56)              References Cited

FOREIGN PATENT DOCUMENTS

| | | | | |
|----|----|----|----|----|
| SG | 10201808586 U | * | 4/2020 | .............. A47J 17/04 |
| WO | WO-2021217183 A1 | * | 10/2021 | .............. A47J 17/04 |

OTHER PUBLICATIONS

Written Opinion of the International Searching Authority issued Jul. 16, 2021 issued in connection with International Application No. PCT/US2021/070442 (4 pages total).

* cited by examiner

Segments gradually advance inward (305)

Channel knife
(110)
(not shown)

105

505

510

515

CITRUS PEELER

CROSS-REFERENCE TO RELATED APPLICATIONS

This Non-Provisional Patent Application claims the benefit of and priority to Patent Cooperation Treaty (PCT) Application Serial No. PCT/US2021/070442, filed Apr. 22, 2021, entitled "Citrus Peeler" which claims the benefit of and priority to U.S. Provisional Patent Application Ser. No. 63/014,655, entitled "Citrus Peeler," filed Apr. 23, 2020, the entire contents of both applications of which are hereby incorporated herein by reference.

BACKGROUND

Various citrusy fruits have an outer skin, or rind, that is peeled away so a person can access and ingest the fruit sac underneath. Some people choose to use their hands and fingernails to peel small pieces of the rind away and then periodically peel the pith (e.g., the white portion of an orange) away as they eat the fruit. Peeling the rind and pith off the fruit can be time-consuming and sometimes a daunting and frustrating task, especially to people with medical conditions like arthritis or certain skin allergies to citrus fruits.

SUMMARY

A citrus peeler is configured with properties to make removing a fruit's outer skin and pith easier for a user. The citrus peeler can be used with fruits like grapefruit, orange, pomelo, etc. The citrus peeler has a handle and a neck extending from the handle. The neck is flattened relative to the handle, and the neck is divided into a peel segment and a support segment, in which each segment is separated by a gap. Extending substantially perpendicular from the peel segment's top surface is a channel knife for cutting the rind off of the fruit in a ribbon-like shape. The channel knife extends vertically from the peel segment of the neck and is thin and sharpened to enable easy cutting of the fruit's rind, or outer skin. The channel knife can smoothly cut around the circumference of the fruit to create a circumferential channel that provides the entry point to the fruit sac and leaves a long rind ribbon the length of the circumference of the fruit behind.

Once the channel is carved into the fruit's outer skin, the user can then maneuver the curved head of the neck underneath the rind for removal. Typically, the rind can be removed in two pieces, that is, the two pieces on opposing sides of the created channel. The head of the neck bends upward at an obtuse angle. The head of the neck includes an outer serrated knife which helps cut the stem at the top and bottom ends of the fruit.

An outer serrated knife is on an outside portion of the peel segment at the head of the neck. In typical implementations, the outer serrated knife can be used to cut the stem attaching the rind and mesocarp on the top and bottom of the citrus fruit, as well as scrape unwanted portions of the fruit, such as the pith (i.e., the white layer of an orange). The outer serrated knife is located on the outside to un-obstruct smooth separation of the rind from the mesocarp. The support segment, which is opposite the peel segment, is typically smooth to prevent any inadvertent injury while using the citrus peeler, as well as making the separation of the rind from mesocarp smooth and soft while producing a satisfying crunchy sound. In other implementations, the various sharpened portions and channel knife may be all reversed on the citrus peeler to, for example, accommodate lefties and righties. In addition, the shape of the rind removed by the citrus peeler, both solid halves of the rind in a cup-like shape and the long rind ribbon produced by the channel knife, lend themselves for use in food and dessert preparation as well as in bartending environments in cocktail preparation as a garnish.

DETAILED DESCRIPTION

Figure 1:
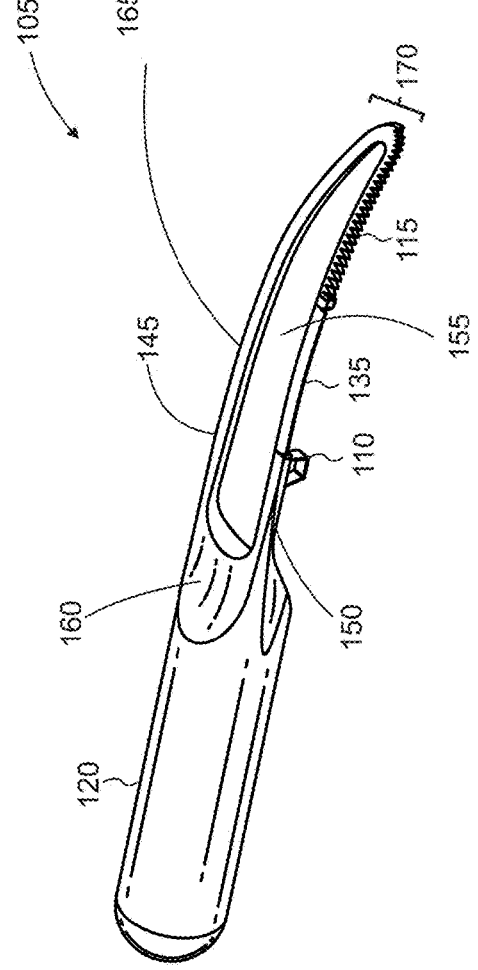
FIGS. 1-3 show illustrative representations of a citrus peeler with a bent head.
Figure 2:
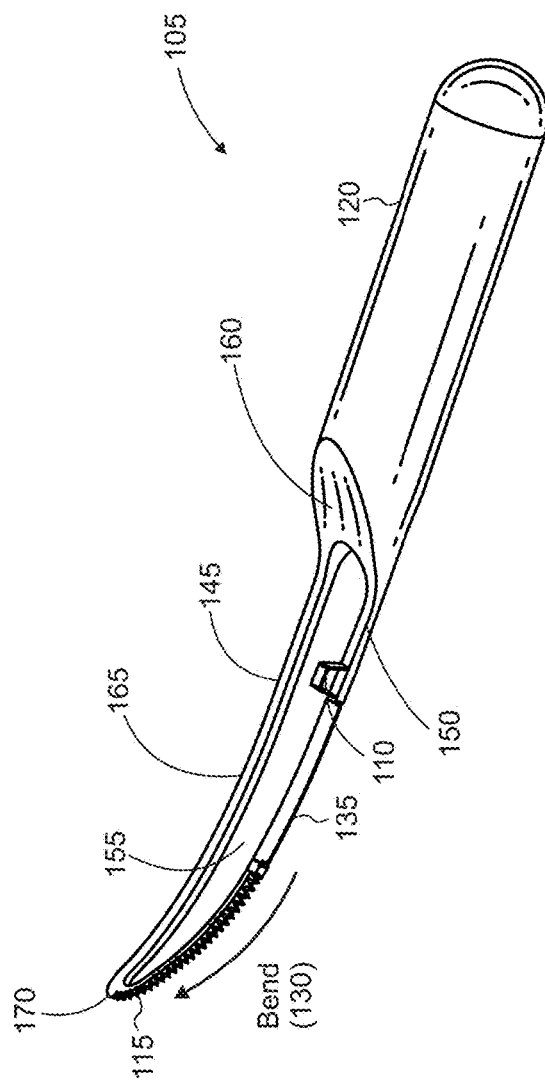

FIGS. 1 and 2 show illustrative representations of a citrus peeler 105, which can be used to easily remove rind (the outer skin) or pith (spongy white tissue lining) from a piece of fruit such as an orange, grapefruit, pomelo, or other citrus fruits. The citrus peeler is designed and configured with various structural components and modifications to make the removal of the rind and pith easy and pleasant for the user. An illustration of the citrus peeler in use is provided below and with respect to FIGS. 5-10.

The citrus peeler 105 includes a cylindrical handle 120 that tapers 160 down to accommodate a typical citrus fruit's round shape and provides additional safety and comfort as it hugs the fruit's shape tightly while guiding the channel knife. The handle tapers down to a neck 165 divided into a support segment 145 and a peel segment 150 separated by a gap 155. The support segment is pulled towards the user's thumb and leans the fruit into the tool's tapered handle. As such, the support segment may be smooth to prevent any inadvertent injury while using the citrus peeler. In other implementations, the various sharpened portions, channel knife, and smoothened support segment may be reversed on the citrus peeler to, for example, accommodate lefties and righties and different grips.

The neck 165 forms a substantially flat surface to fit underneath the fruit's rind, as discussed in greater detail below. The neck begins to bend 130 in an upward direction at its head 170, which is on a distal end of the neck. The bend is gradual to accommodate a typical fruit's shape. The head's upward bend enables the user to manipulate the neck more easily underneath the fruit's rind. The bent head also complements a typical fruit's round shape, making it easier to advance the citrus peeler underneath the rind. The peel segment portion of the head has a serrated edge to cut the stem that connects the rind and mesocarp at the top and bottom of the fruit.

The peel segment 150 includes a channel knife 110 that extends in a vertical direction from the top of the peel segment's surface. The channel knife includes a hole in its center to allow the peeled rind ribbon to escape. The channel knife has two arms that extend vertical and inward toward the other, and the arms meet at a top surface. The channel knife may be thin and sharp enough to cut through a fruit's rind. Between the channel knife and the serrated edge 115 is a blade 135 that can be used to peel the pith from fruit after the rind has been removed. The blade can be rubbed against the pith, and then the user can pull the pith away. Although not shown, in some implementations, an inner blade or serrated knife can be positioned at the head's interior adjacent to the gap. This inner blade can be used for peeling pith away as well.

Figures 3, 4:
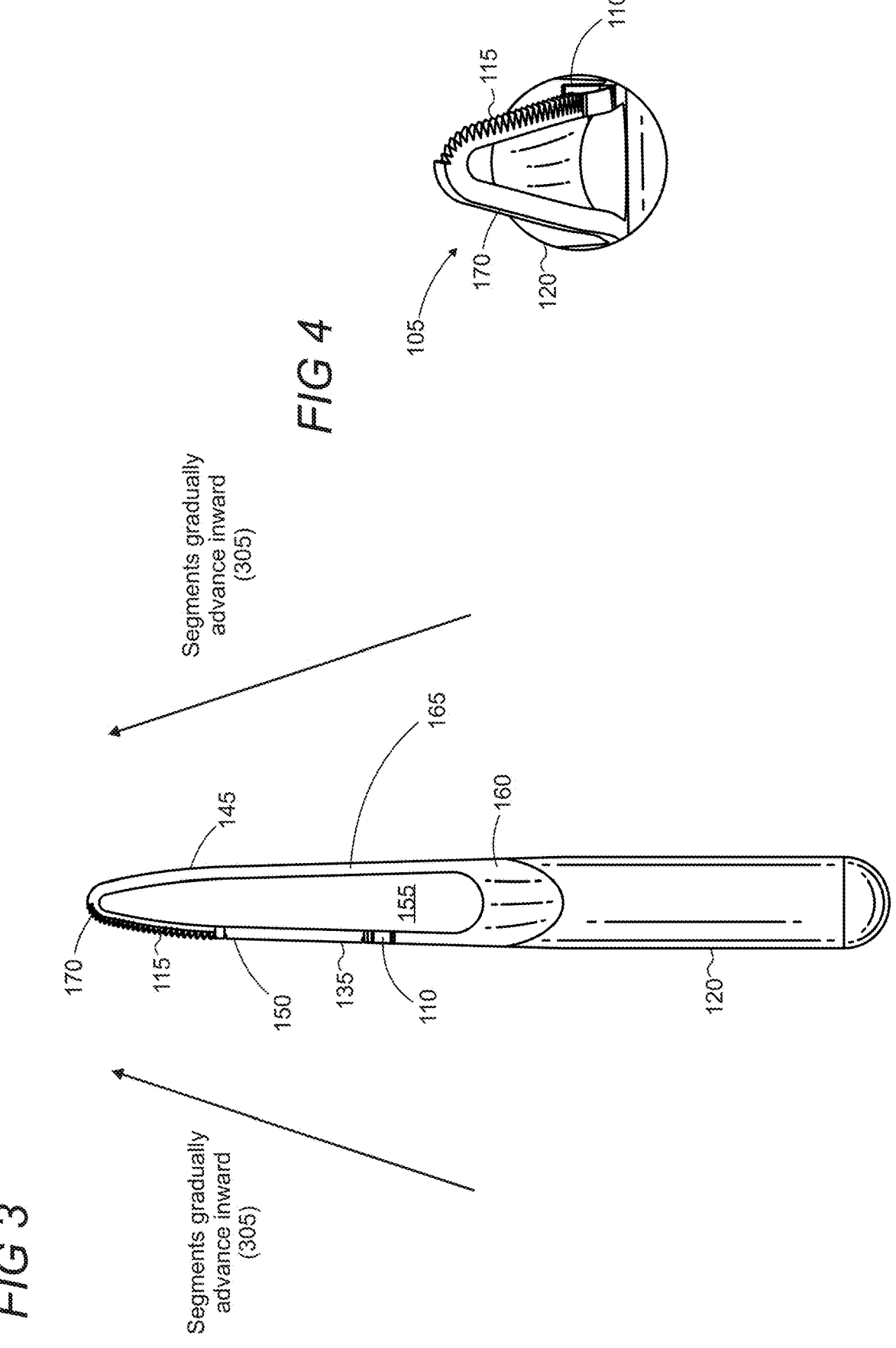
FIG. 4 shows an illustrative representation of the citrus peeler's head.

FIG. 3 shows an illustrative top view representation in which the peel and support segments 150, 145 gradually advance inward 305 from the base of the neck to the head 170. The inward inclination of the segments helps form a point at the head and makes inserting the head and neck underneath the rind easier. As shown in FIG. 3, the channel knife 110 extends vertically from the neck's surface and is substantially perpendicular to the neck.

FIG. 4 shows an illustrative representation of the head's upward bend from the neck's plane. A portion of the head 170 and outer serrated edge 115 extend at least partially above a top plane of the handle 120. The bend helps complement the shape of the fruit and insert and manipulate the head and neck 165 once underneath the fruit's rind.

Figure 5:
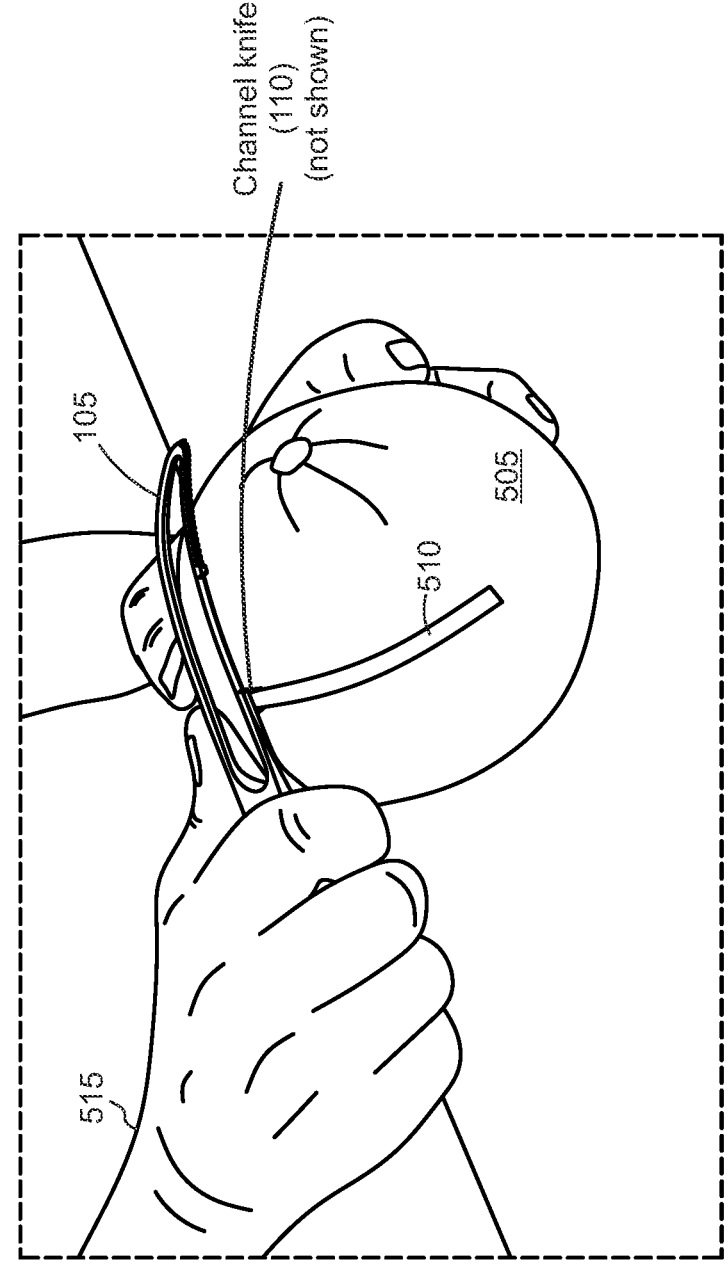
FIG. 5 shows an illustrative representation of the citrus peeler's channel knife removing the rind from an orange.

FIGS. 5-10 show graphical and sequential representations in which the citrus peeler is used for removing rind and pith from a piece of fruit, such as an orange 505. In FIG. 5, user 515 inserts the channel knife 110 in the center region of the fruit's rind. The user then maneuvers the channel knife horizontally around the fruit's circumference, as shown by the peel 510 while the user spins the fruit towards the channel knife.

Figure 6:
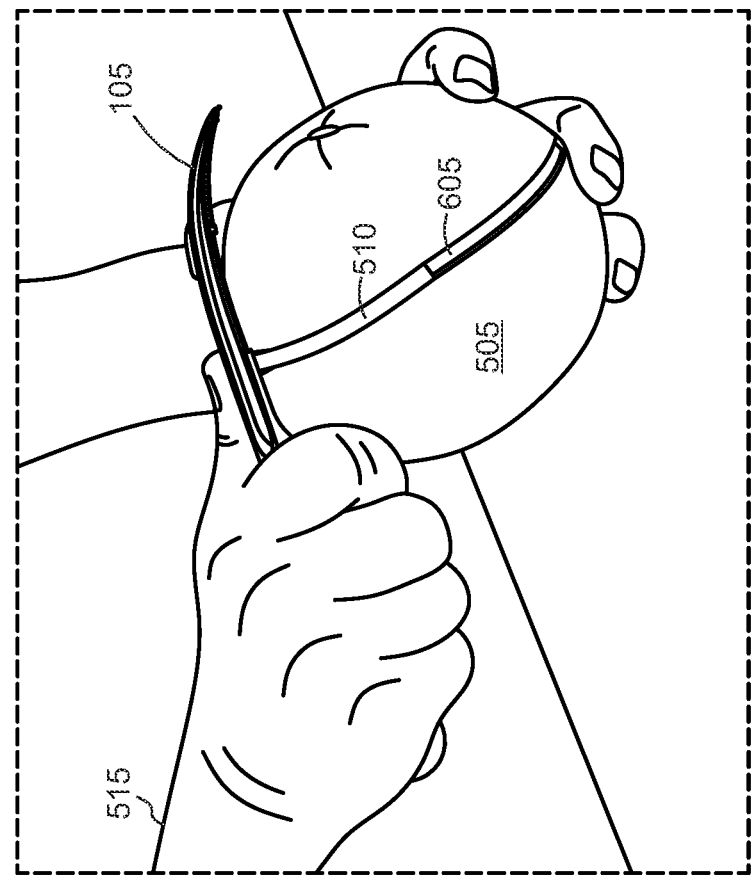
FIG. 6 shows an illustrative representation of the citrus peeler removing the orange's rind around its perimeter and creating a ribbon string rind shape.

In FIG. 6, the user continues to advance the channel knife 110 through the rind. Some of the rind begins to peel off in a ribbon shape to expose the fruit's sac 605, or mesocarp. The user continues to peel the rind with the channel knife until a full circle is made and a channel extends around the entire rind.

Figure 7:
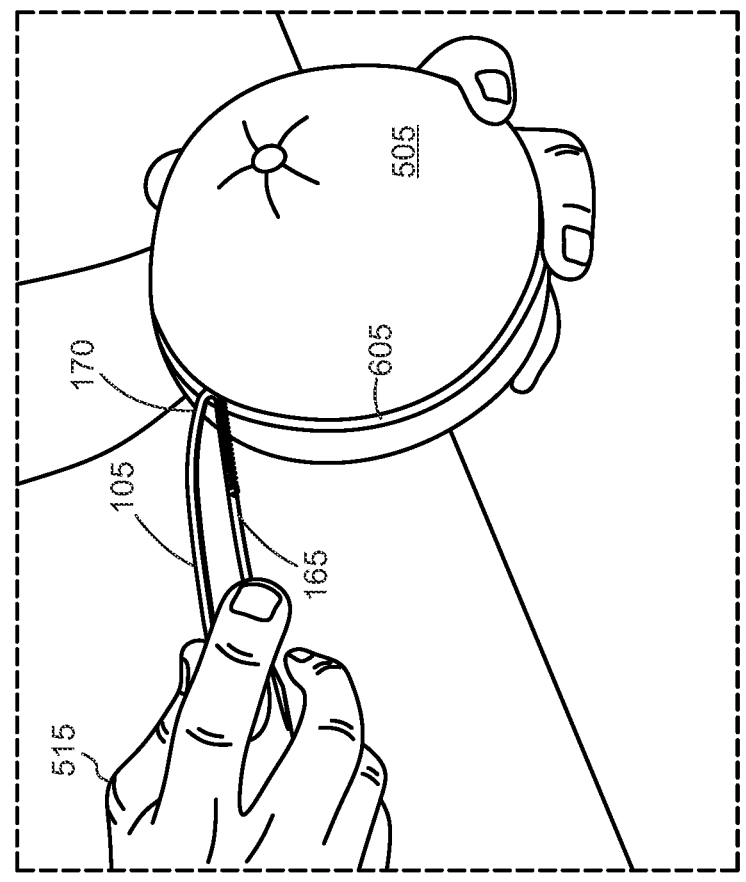
FIG. 7 shows an illustrative representation in which the citrus peeler's head is wedged underneath the fruit's rind.

In FIG. 7, the user has completed channel 605 in the fruit's rind. The user then uses and inserts the head 170 of the citrus peeler 110 underneath the rind. The outer serrated edge 170 can cut off the stem holding the rind and mesocarp together at the top.

Figure 8:
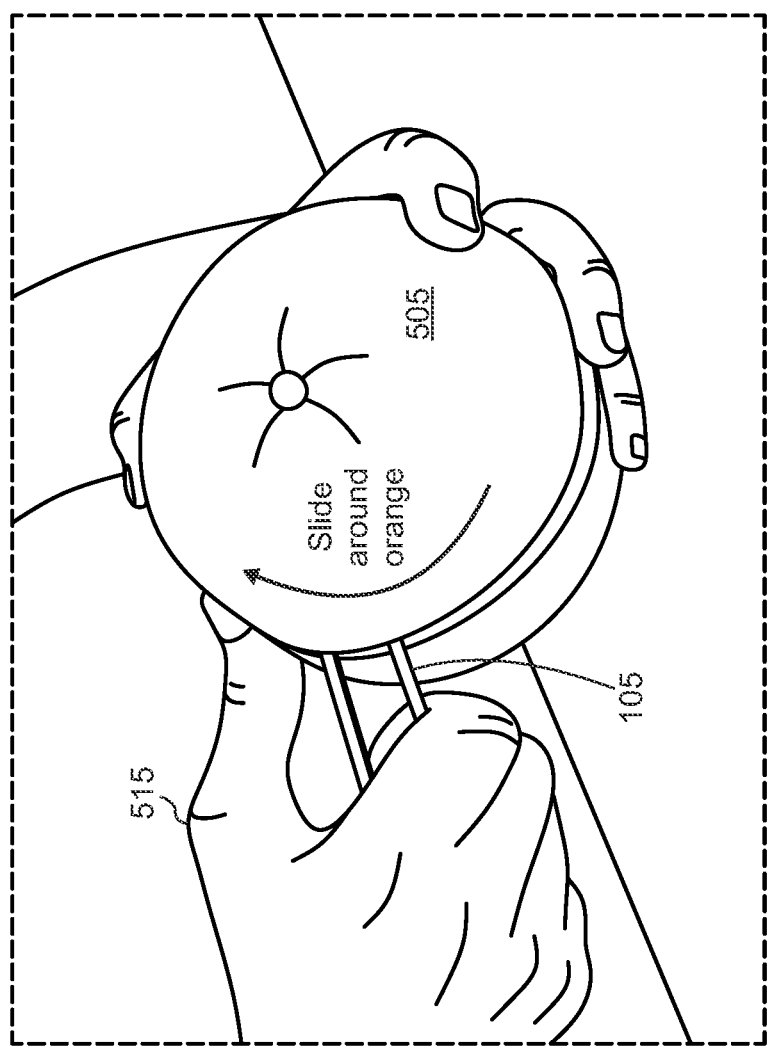
FIG. 8 shows an illustrative representation in which the citrus peeler is advanced around the orange underneath the orange's rind.
Figure 9:
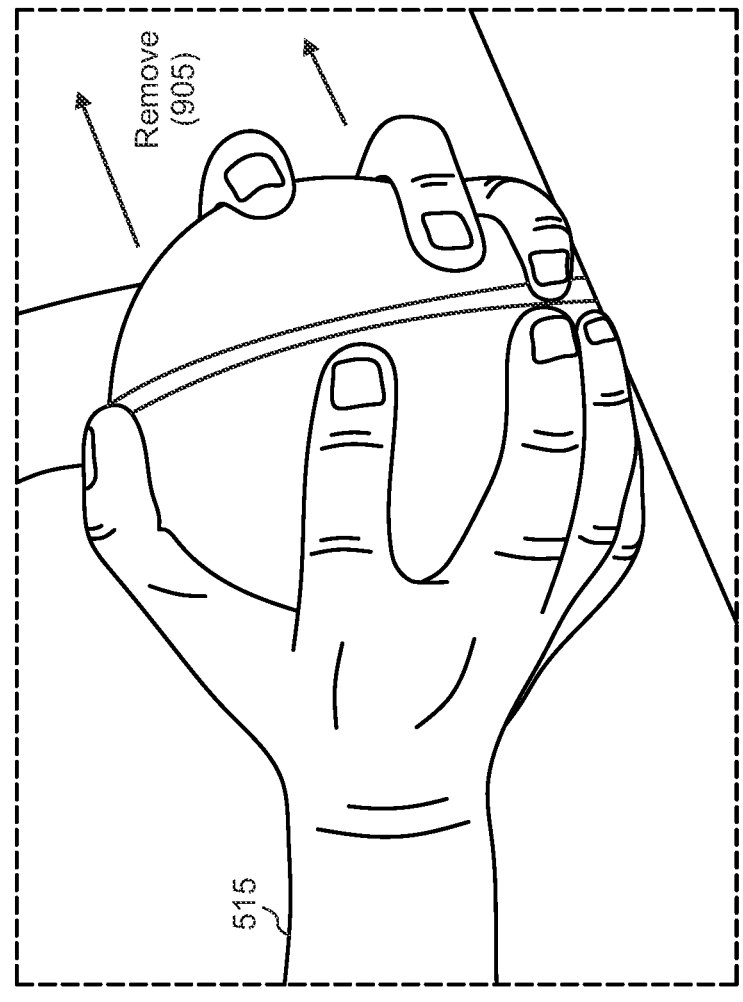
FIG. 9 shows an illustrative representation in which the user twists the rind to finish the separation, pulls and removes half of the orange's rind from the body.

In FIG. 8, the user slides the inserted citrus peeler around the circumference of the orange while spinning the fruit towards the peeler. This movement helps remove the rind's attachment to the fruit's mesocarp. In FIG. 9, the user puts down the citrus peeler and attempts to twist, pull away, and remove 905 the rind half on which the user used the citrus peeler (FIGS. 7 and 8). Since the rind's attachment to the mesocarp was broken when the user maneuvered the head 170 and neck 165 along the circumference of the inner rind, completely removing the rind in one solid piece becomes easier.

Figure 10:
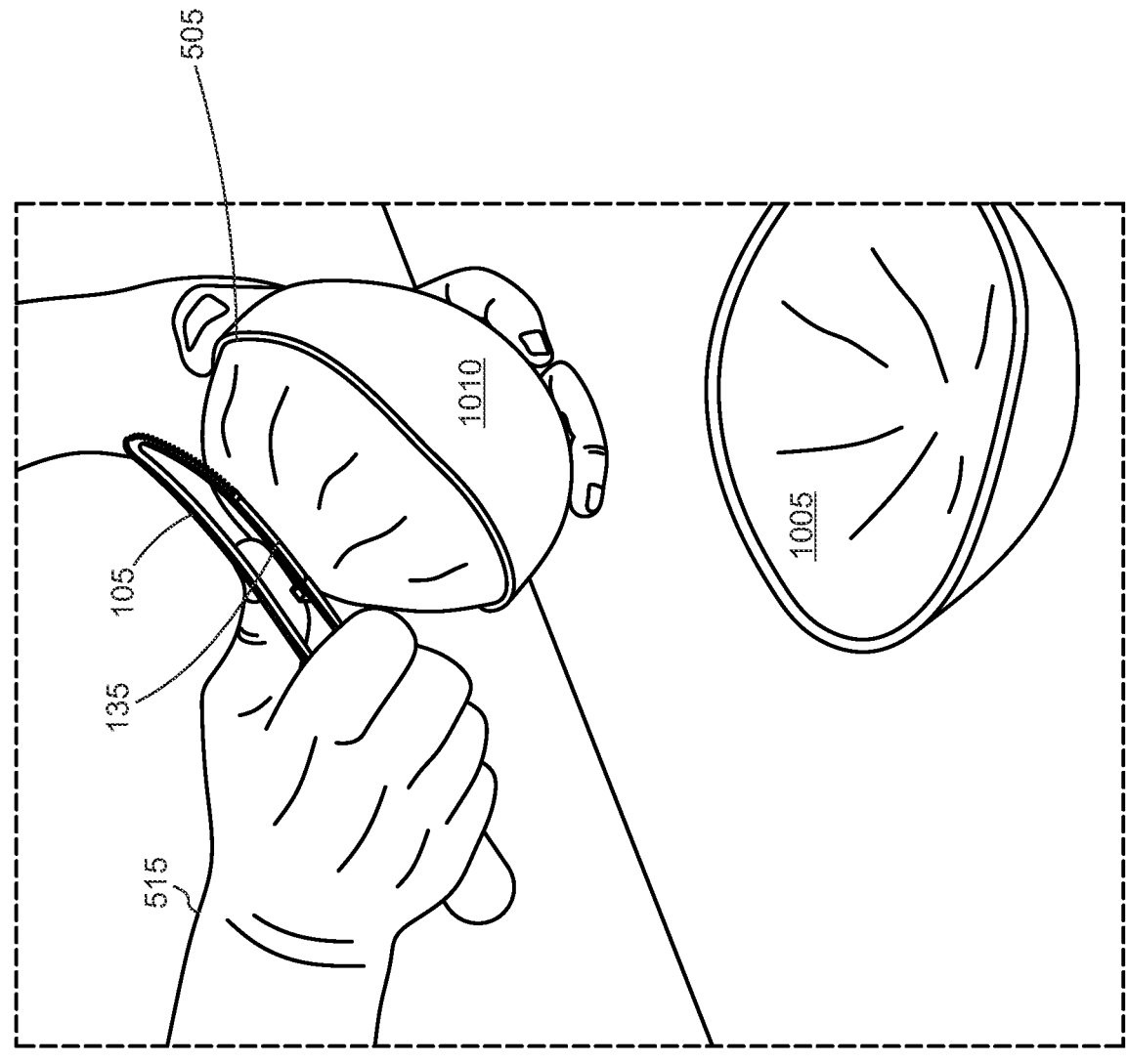
FIG. 10 shows an illustrative representation in which the user uses the citrus peeler's blade to trim the fruit's pith.

In FIG. 10, the user successfully removed the rind half 1005 from the fruit's mesocarp. The user then uses blade 135 on the peel segment to scrape away any pith from the fruit's sac. The user can repeat steps shown in FIGS. 5-10 for the other rind half 1010. Specifically, the user can insert the head

170 and advance the head and neck 165 around the fruit to detach the rind from the mesocarp. The user can then pull the other rind half off once it has been sufficiently detached using the neck. The user can either continue to take the pith away using blade 135 or begin consuming the edible portion of the fruit.

Various implementations are disclosed herein. One exemplary implementation includes a citrus peeler, comprising: a handle; a neck extending from the handle; a channel knife extending vertically upward from the neck, in which the channel knife is thin and sharpened to enable cutting of a channel in a fruit's outer skin; and an outer serrated head at a distal end of the neck, in which the neck includes a bend that causes the out serrated head to form an obtuse angle relative to the neck's plane.

As another example, the neck is flattened relative to the handle. In that example, the handle tapers into the flattened neck. As another example, the bend is a gradual upward curve that begins at the distal end of the neck. In that example, the outer serrated edge occupies a portion of the curved head, and the curved head is partially smooth. As a further example, the neck includes a peel segment and a support segment separated from each other on opposing sides of the neck by a gap. The peel segment includes the channel knife and the outer serrated edge. As another example, the peel segment includes a sharpened blade on an outside surface of the peel segment's neck, the sharpened blade running parallel to the neck. As a further example, the support segment and the peel segment combine at the distal end of the neck. In another example, a serrated portion of the outer serrated head begins when the head begins to bend upward relative to the neck's plane. As another example, the channel knife includes a hollow center to enable the fruit's outer skin to peel away and travel through the hollow center upon being cut by the channel knife's sharpened exterior, creating an uninterrupted solid ribbon.

In another exemplary embodiment, a kitchen utensil adapted to remove an outer rind from a piece of fruit is disclosed, comprising: a handle; a neck extending from the handle, in which the neck is separated into a peel segment and a support segment that are separated by a gap, in which the peel segment is adapted with structural properties to enable removing a fruit's outer rind, and the support segment is adapted with structural properties to enable removing the fruit's pith; a channel knife extending vertically upward from the peel segment of the neck, in which the channel knife is sharpened to enable cutting of a channel in the fruit's outer rind; and a head at a distal end of the neck, in which the head is at least partially serrated on the neck's peel segment. As another example, the peel segment and the pith segment are at least partially separated by a hollow space in a middle of the neck. In another example, the peel segment and the support segment come together at the head of the neck. In another example, the support segment is smooth to prevent injury to a user. As another example, the neck includes a bend that causes the head to form an obtuse angle relative to a plane of the neck. As another example, the serrated portion of the head begins when the head starts to bend upward. As a further example, the channel knife includes a hollow center.

The invention claimed is:

1. A citrus peeler, comprising:
   a V-shaped neck defining a peel segment and a support segment, each of the peel segment and the support segment incorporating a flat portion that together define a flat portion of the neck and a bend that together define a bend in the neck, wherein the bend of the neck and the flat portion of the neck define an obtuse angle;

the flat portion of the peel segment incorporates a sharpened straight blade edge portion and the bend of the peel segment incorporates a serrated edge portion;

the flat portion of the peel segment incorporates a channel knife, the channel knife extends outward from the flat portion of the peel segment in a substantially perpendicular direction in relation to the flat portion of the peel segment, the channel knife includes at least three sharpened sides and a hollow center to enable cutting of a channel in a skin of a piece of fruit; and a handle attached to the flat portion of the peel segment and to the flat portion of the support segment thereby defining a gap that at least partially separates the peel segment and the support segment to define the V-shape.

2. The citrus peeler of claim 1, wherein the handle tapers at least toward the flat portion of the peel segment.

3. The citrus peeler of claim 1, wherein the bend is a gradual curve.

4. The citrus peeler of claim 3, wherein an outer portion of the support segment includes a partially smooth edge.

5. The citrus peeler of claim 1, wherein the support segment and the peel segment meet at a distal end of the neck where the gap between the support and peel segments end.

* * * * *